United States Patent
Daley (10) Patent No.: US 11,594,084 B2
(45) Date of Patent: Feb. 28, 2023

(54) VEHICLE WARNING LIGHT MONITORING ASSEMBLY

(71) Applicant: Matthew Daley, Bronx, NY (US)

(72) Inventor: Matthew Daley, Bronx, NY (US)

(*) Notice: Subject to any disclaimer, the term of this patent is extended or adjusted under 35 U.S.C. 154(b) by 329 days.

(21) Appl. No.: 16/935,390

(22) Filed: Jul. 22, 2020

(65) Prior Publication Data
US 2022/0028190 A1 Jan. 27, 2022

(51) Int. Cl.
| | |
|---|---|
| *G07C 5/08* | (2006.01) |
| *G09G 5/00* | (2006.01) |
| *B60Q 3/80* | (2017.01) |
| *B60Q 3/70* | (2017.01) |

(52) U.S. Cl.
CPC ............ *G07C 5/0825* (2013.01); *B60Q 3/70* (2017.02); *B60Q 3/80* (2017.02); *G09G 5/00* (2013.01); *G09G 2380/10* (2013.01)

(58) Field of Classification Search
CPC .......... G07C 5/0825; B60Q 3/70; B60Q 3/80; G09G 5/00; G09G 2380/10; B60K 2370/1523; B60K 2370/178; B60K 37/02; B60K 2370/193; B60K 2370/33; B60K 35/00; G06F 3/14
See application file for complete search history.

(56) References Cited

U.S. PATENT DOCUMENTS

| | | | |
|---|---|---|---|
| 786,759 A | 4/1905 | Hansen | |
| 4,320,383 A | 3/1982 | Lumbroso | |
| 5,075,669 A | 12/1991 | Nakadozono | |
| 6,664,736 B1 | 12/2003 | Pakkala | |
| 8,260,516 B2 | 9/2012 | Bechtler | |
| 8,884,749 B1 * | 11/2014 | Palmer | B60Q 5/005 340/439 |
| 9,621,811 B2 | 4/2017 | Cuddihy | |
| 2005/0190050 A1 | 9/2005 | Ross | |
| 2017/0072854 A1 | 3/2017 | Cornelius | |

FOREIGN PATENT DOCUMENTS

WO WO2004048151 6/2004

OTHER PUBLICATIONS

"OBD port—What is an OBD port and how is it used?" Jul. 26, 2021, Archive.org.*
"Easy Flash Module 2.0", Jan. 27, 2019, Archive.org.*

* cited by examiner

*Primary Examiner* — David D Davis (57) ABSTRACT

A vehicle warning light monitoring assembly includes a monitoring circuit that is integrated into an electrical system of a vehicle. The monitoring circuit is in electrical communication with each of a plurality of exterior lights on the vehicle. A display is integrated into a dashboard of the vehicle to display the name of one of the exterior lights on the vehicle that has malfunctioned. A communication unit is pluggable into a data port in a vehicle to receive operational data pertaining to the exterior lights of the vehicle. The communication unit displays exactly which exterior light on the vehicle has malfunctioned. Additionally, the communication unit is wireless communication with a personal electronic device for communicating the operational data to the personal electronic device.

8 Claims, 6 Drawing Sheets

VEHICLE WARNING LIGHT MONITORING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to warning monitoring devices and more particularly pertains to a new warning monitoring device for notifying a driver of a vehicle exactly which exterior light on the vehicle has malfunctioned.

(2) Description of Related Art Including Information Disclosed Under 37 CFR 1.97 and 1.98

The prior art relates to warning monitoring devices including a variety of different circuit designs for fault detection in light bulbs. The prior art also discloses a light bulb fault detection device that relies on acceleration forces in determining a fault condition in a light bulb. The prior art discloses a fault detection circuit for determining if a sensor has returned to normal operational after a malfunction has been detected. The prior art discloses a vehicle headlight fault identification system that measures and compares brightness of each headlight to identify a potential fault in the vehicle headlights. The prior art discloses a rear light out sensor that is integrated into a dashboard of a vehicle for notifying a driver when a rear light on the vehicle has malfunctioned.

BRIEF SUMMARY OF THE INVENTION

An embodiment of the disclosure meets the needs presented above by generally comprising a monitoring circuit that is integrated into an electrical system of a vehicle. The monitoring circuit is in electrical communication with each of a plurality of exterior lights on the vehicle. A display is integrated into a dashboard of the vehicle to display the name of one of the exterior lights on the vehicle that has malfunctioned. A communication unit is pluggable into a data port in a vehicle to receive operational data pertaining to the exterior lights of the vehicle. The communication unit displays exactly which exterior light on the vehicle has malfunctioned. Additionally, the communication unit is wireless communication with a personal electronic device for communicating the operational data to the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
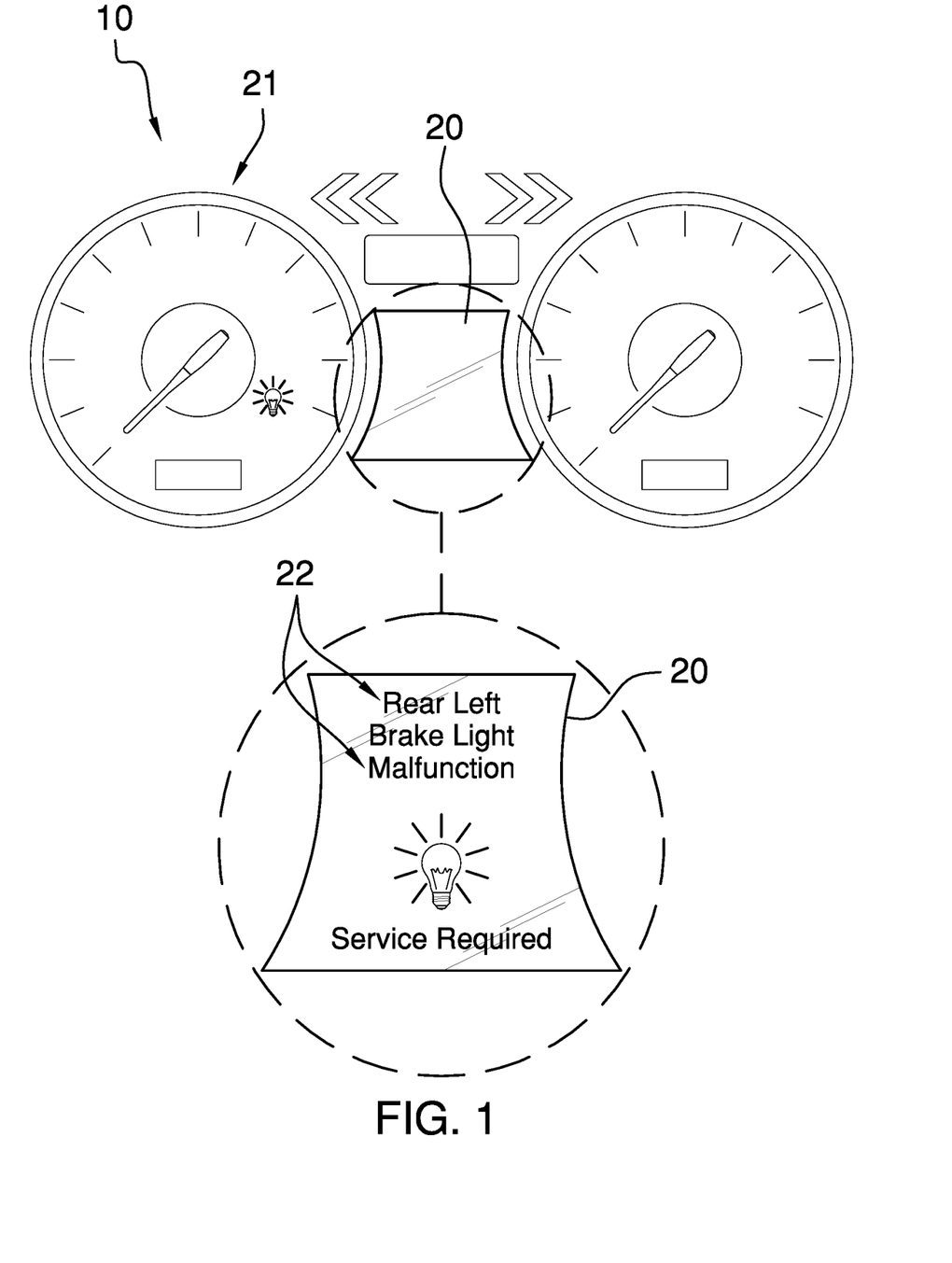
FIG. 1 is a dashboard view of a vehicle warning light monitoring assembly according to an embodiment of the disclosure.
Figure 2:
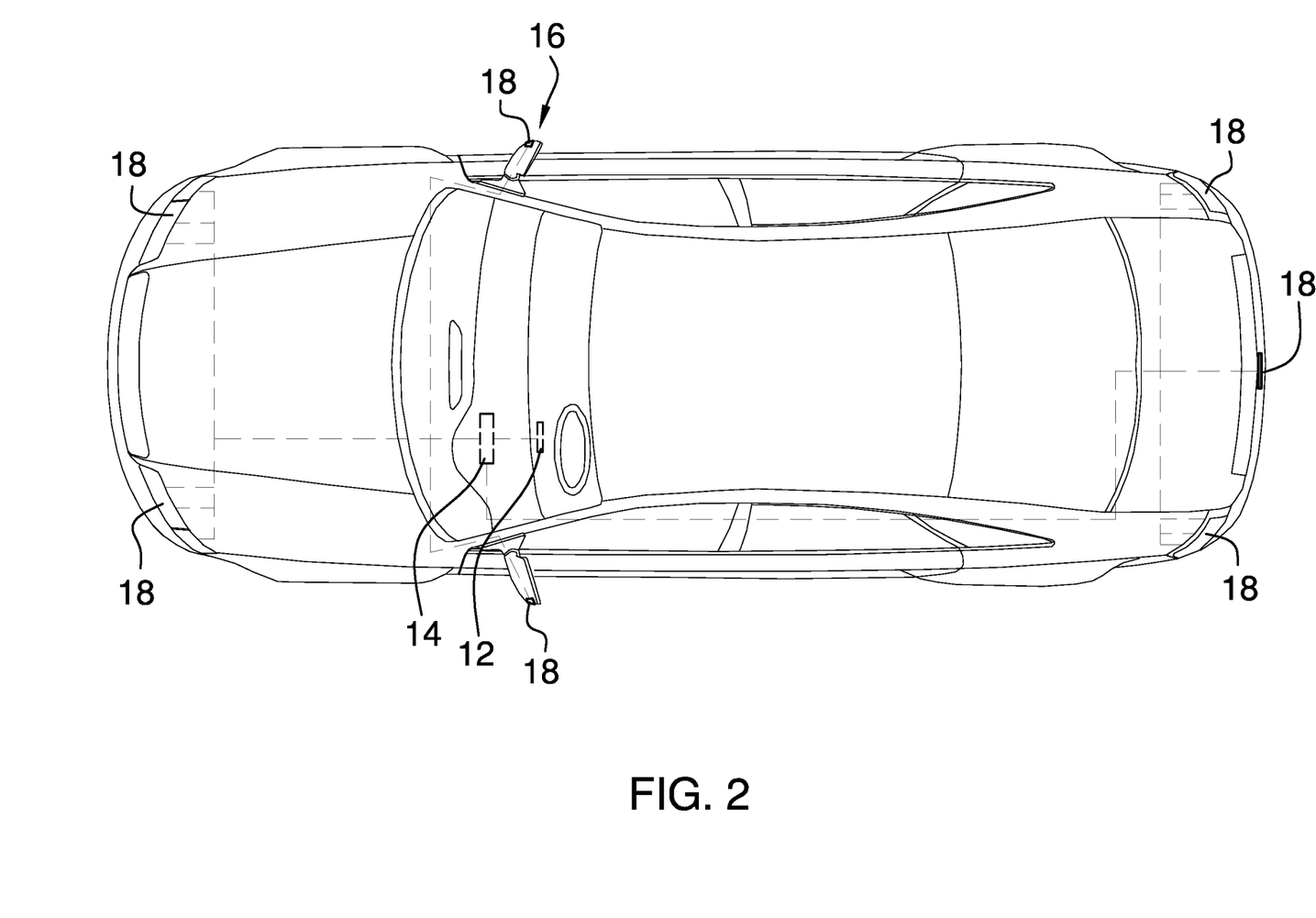
FIG. 2 is a phantom in-use view of an embodiment of the disclosure.
Figure 3:
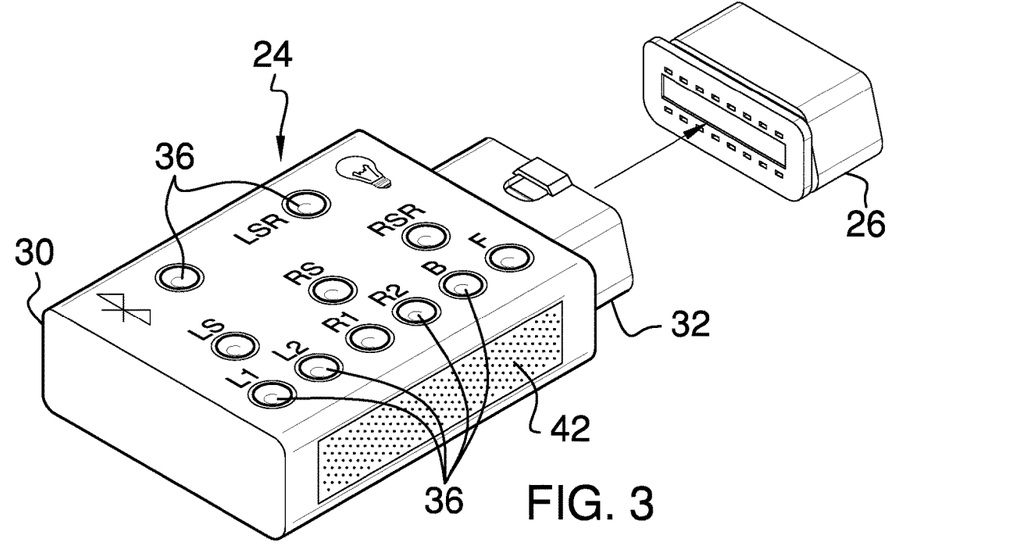
FIG. 3 is a perspective view of a communication unit of an embodiment of the disclosure.
Figure 4:
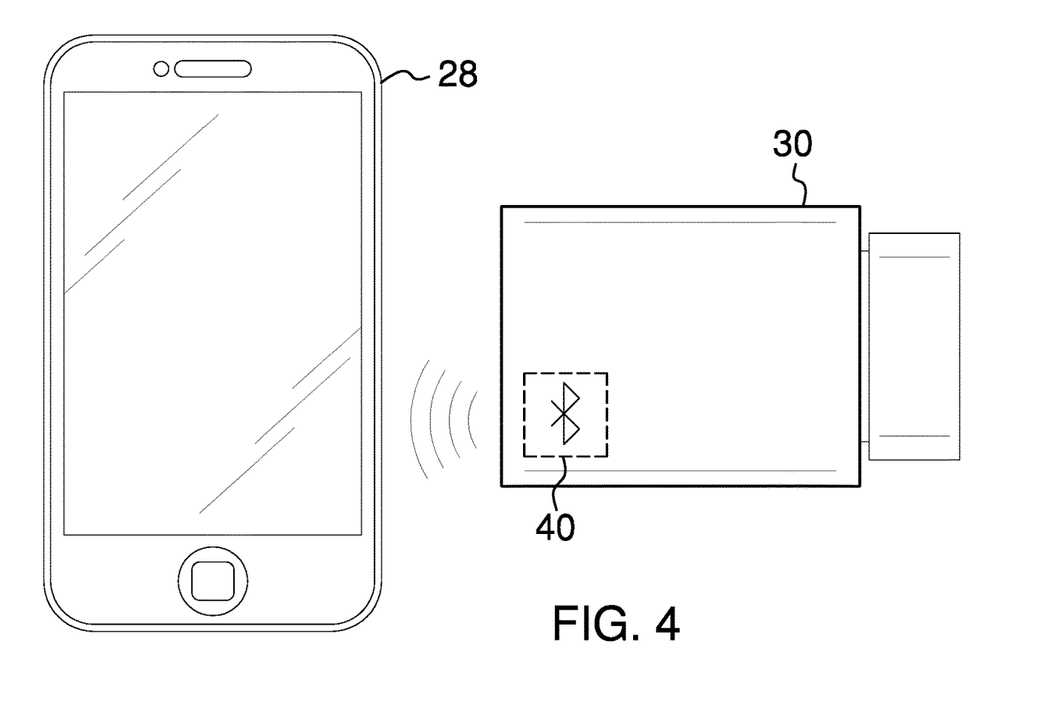
FIG. 4 is a bottom view of a communication unit of an embodiment of the disclosure.
Figure 5:
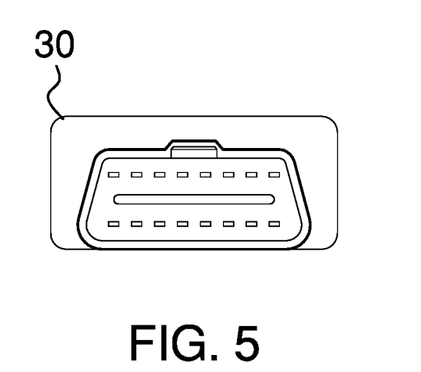
FIG. 5 is a front view of a communication unit of an embodiment of the disclosure.
Figure 6:
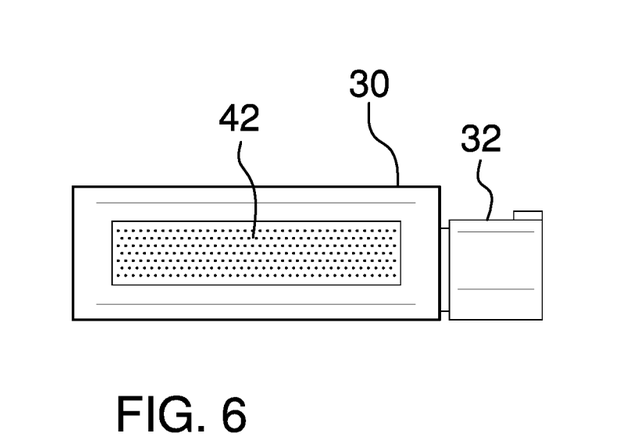
FIG. 6 is a right side view of a communication unit of an embodiment of the disclosure.
Figure 7:
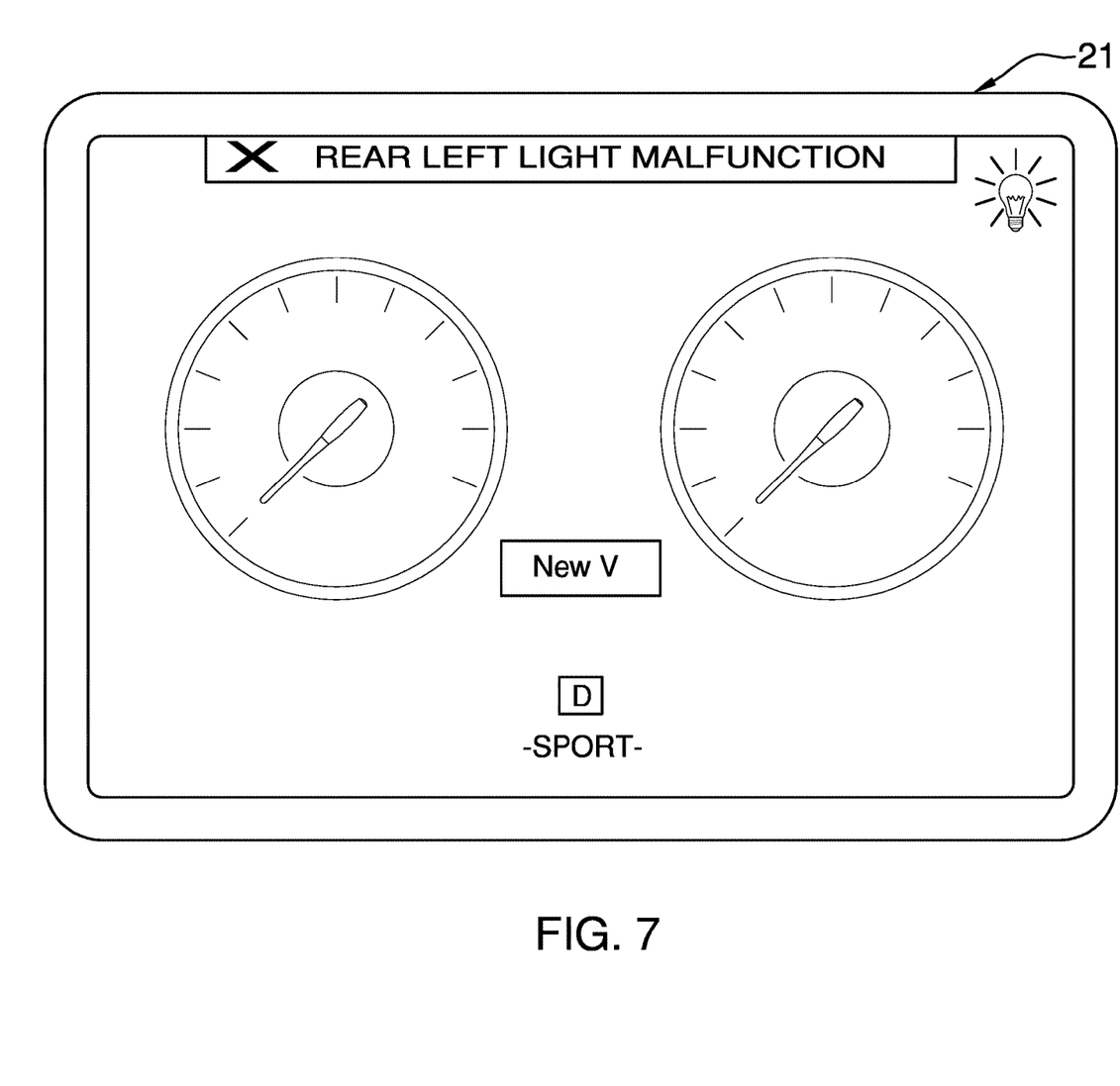
FIG. 7 is a dashboard view of an embodiment of the disclosure showing a flat panel display for a dashboard.
Figure 8:
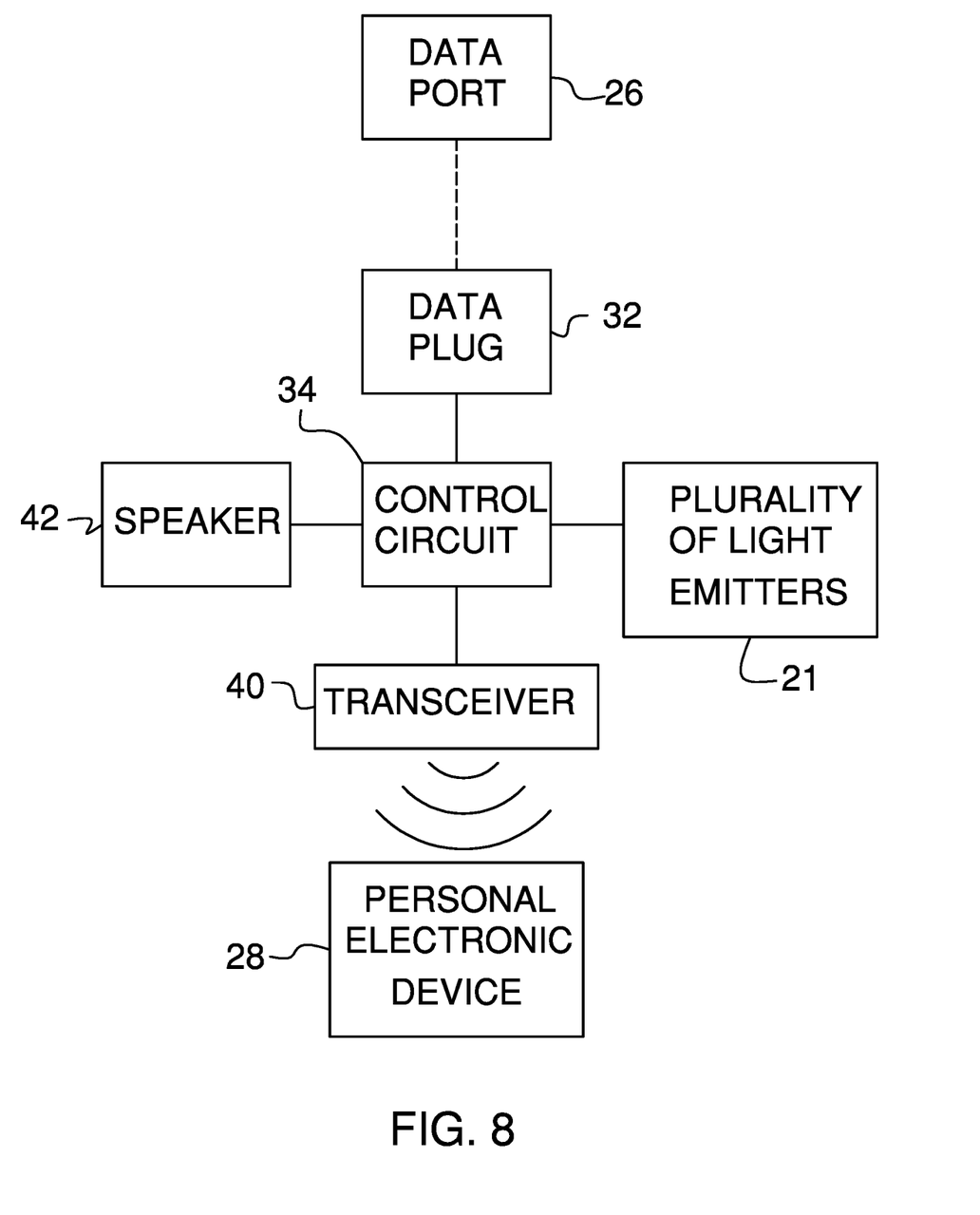
FIG. 8 is a schematic view of an embodiment of the disclosure.

With reference now to the drawings, and in particular to FIGS. 1 through 8 thereof, a new warning monitoring device embodying the principles and concepts of an embodiment of the disclosure and generally designated by the reference numeral 10 will be described.

As best illustrated in FIGS. 1 through 8, the vehicle warning light monitoring assembly 10 generally comprises a monitoring circuit 12 is integrated into an electrical system 14 of a vehicle 16 at the manufacturing date of the vehicle 16. The vehicle 16 may be a passenger vehicle, a cargo vehicle or any other motorized vehicle that is driven on public roadways. The monitoring circuit 12 is in electrical communication with each of a plurality of exterior lights 18 on the vehicle 16 and the monitoring circuit 12 receives an alert input when any of the exterior lights 18 malfunctions. Moreover, the monitoring circuit 12 assigns a unique identification to each of the exterior lights 18. The plurality of exterior lights 18 includes, but is not limited to, headlights, blinkers, tail lights, brake lights, fog lights and other similar exterior lights commonly used on vehicles.

A display 20 is integrated into a dashboard 21 of the vehicle 16 at the manufacturing date of the vehicle 16 such that the display 20 is visible to a driver. The display 20 is in electrical communication with the monitoring circuit 12 and the display 20 displays indicia 22 comprising the names of each of the exterior lights 18 on the vehicle 16. Moreover, the display 20 displays the name of one of the exterior lights 18 that corresponds to a malfunction detected by the monitoring circuit 12. In this way the display 20 can inform the driver exactly which exterior light 18 on the vehicle 16 has malfunctioned.

Each of the names of the exterior lights 18 is associated with the unique identification of a respective one of the exterior lights 18. Additionally, the display 20 displays the name of the exterior light 18 associated with the unique identification received from the monitoring circuit 12. The display 20 may comprise an LED or other similar type of electronic display. As is most clearly shown in FIG. 7, the dashboard 21 gauge cluster may comprise a flat panel display or other type of electronic display.

A communication unit 24 is provided and the communication unit 24 is pluggable into a data port 26 in a vehicle 16 after the manufacturing date of the vehicle 16. In this way the communication unit 24 can act as an aftermarket add-on. The communication unit 24 is in electrical communication with an electrical system 14 of the vehicle 16 when the communication unit 24 is plugged into the data port 26. In this way the communication unit 24 can receive operational data pertaining to the exterior lights 18 of the vehicle 16. The data port 26 in the vehicle 16 may comprise a female OBD II port or other similar style of standardized data port 26.

The communication unit 24 displays a visual alert that corresponds to each of the exterior lights 18 of the vehicle 16 when the communication unit 24 receives operational data indicating a malfunction in one or more of the exterior lights 18. In this way the communication unit 24 can inform the driver exactly which exterior light on the vehicle 16 has malfunctioned. The communication unit 24 is wireless communication with a personal electronic device 28 for communicating the operational data to the personal electronic device 28. The personal electronic device 28 may comprise a smart phone or other similar type of device that has wireless communication capabilities.

The communication unit 24 comprises a housing 30 that has a data plug 32 integrated therein and the data plug 32 is pluggable into the data port 26 in the vehicle 16. The data plug 32 may comprise a male OBD II data plug or other type of data plug that corresponds to the data port 26. The communication unit 24 includes a control circuit 34 that is positioned in the housing 30. The control circuit 34 is electrically coupled to the data plug 32 such that the control circuit 34 receives the operational data from the electrical system 14 of the vehicle 16. The control circuit 34 receives an alert input when any of the exterior lights 18 on the vehicle 16 malfunctions.

A plurality of light emitters 36 is each coupled to the housing 30 such that each of the light emitters 36 is visible to the driver. Each of the light emitters 36 is electrically coupled to the control circuit 34 and each of the light emitters 36 is assigned to a respective one of the exterior lights 18 of the vehicle 16. Each of the light emitters 36 is turned on when the control circuit 34 receives the alert input which corresponds to the exterior light 18 to which the actuated light emitter 36 is assigned. In that way the plurality of light emitters 36 can communicate to the user exactly which of the exterior lights 18 has malfunctioned. Each of the light emitters 36 may comprise an LED or other similar type of electronic light emitter.

The communication unit 24 includes a transceiver 40 that is positioned in the housing 30 and the transceiver 40 is electrically coupled to the control circuit 34. The transceiver 40 is in wireless electrical communication with the personal electronic device 28 for communicating the alert input to the personal electronic device 28. In this way the transceiver 40 can notify the driver exactly which of the exterior lights 18 has malfunctioned. The transceiver 40 may comprise a radio frequency transceiver or the like and the transceiver 40 may employ Bluetooth communication protocols. The communication unit 24 includes a speaker 42 that is coupled to the housing 30 for emitting audible sounds outwardly therefrom. The speaker 42 is electrically coupled to the control circuit 34 and the speaker 42 is turned on when the control circuit 34 receives the alert input.

In use, the monitoring circuit 12 actuates the display 20 to indicate exactly which exterior light 18 on the vehicle 16 has failed, such as the left brake light, the right rear blinker, the left headlight and so on. In this way the driver can immediately take measures to fix the malfunction and subsequently avoid a potential traffic violation or traffic accident. The communication unit 24 can be plugged into the data port 26 of an older vehicle 16 in an aftermarket capacity. In this way the communication unit 24 can notify the driver exactly which exterior light 18 on the vehicle 16 has malfunctioned. Additionally, the communication unit 24 can be synched with the driver's personal electronic device 28 for receiving alerts from the communication unit 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle warning light monitoring assembly for alerting a driver when any of a vehicle's warning lights has malfunctioned, said assembly comprising:
 a monitoring circuit being integrated into an electrical system of a vehicle at the manufacturing date of the vehicle, said monitoring circuit being in electrical communication with each of a plurality of exterior lights on the vehicle, said monitoring circuit receiving an alert input when any of the exterior lights malfunctions;

a display being integrated into a dashboard of the vehicle at the manufacturing date of the vehicle wherein said display is configured to be visible to a driver, said display being in electrical communication with said monitoring circuit, said display displaying indicia comprising the names of each of the exterior lights on the vehicle, said display displaying the name of one of the exterior lights that corresponds a malfunction detected by said monitoring circuit wherein said display is configured to alert the driver exactly which exterior light on the vehicle has malfunctioned; and a communication unit being pluggable into a data port in the vehicle after the manufacturing date of the vehicle, said communication unit being in electrical communication with an electrical system of the vehicle when said communication unit is plugged into the data port such that said communication unit receives operational data pertaining to the exterior lights of the vehicle, said communication unit displaying a visual alert that corresponds to each of the exterior lights of the vehicle when said communication unit receives operational data indicating the malfunction in one or more of the exterior lights wherein said communication unit is configured to alert the driver exactly which exterior light on the vehicle has malfunctioned, said communication unit being wireless communication with a personal electronic device for communicating the operational data to the personal electronic device.

2. The assembly according to claim 1, wherein:

said monitoring circuit assigns a unique identification to each of the exterior lights; and each of the names of the exterior lights being associated with the unique identification of a respective one of the exterior lights, said display displaying the name of the exterior light associated with the unique identification received from said monitoring unit.

3. The assembly according to claim 1, wherein said communication unit comprises a housing having a data plug being integrated, said data plug being pluggable into the data port in the vehicle.

4. The assembly according to claim 3, wherein said communication unit includes a control circuit being positioned in said housing, said control circuit being electrically coupled to said data plug such that said control circuit receives the operational data from the electrical system of the vehicle, said control circuit receiving an alert input when any of the exterior lights on the vehicle malfunctions.

5. The assembly according to claim 4, wherein said communication unit includes a plurality of light emitters, each of said light emitters being coupled to said housing wherein each of said light emitters is configured to be visible to the driver, each of said light emitters being electrically coupled to said control circuit.

6. The assembly according to claim 5, wherein each of said light emitters is assigned to a respective one of the exterior lights of the vehicle, each of said light emitters being turned on when said control circuit receives said alert input which corresponds to the exterior light to which said light emitter is assigned wherein said plurality of light emitters is configured to communicate to the user exactly which of the exterior lights has malfunctioned.

7. The assembly according to claim 4, wherein said communication unit includes a transceiver being positioned in said housing, said transceiver being electrically coupled to said control circuit, said transceiver being in wireless electrical communication with the personal electronic device for communicating the alert input to the personal electronic device wherein said transceiver is configured to notify the driver exactly which of the exterior lights has malfunctioned.

8. A vehicle warning light monitoring assembly for alerting a driver when any of a vehicle's warning lights has malfunctioned, said assembly comprising:

a monitoring circuit being integrated into an electrical system of a vehicle at the manufacturing date of the vehicle, said monitoring circuit being in electrical communication with each of a plurality of exterior lights on the vehicle, said monitoring circuit receiving an alert input when any of the exterior lights malfunctions, said monitoring circuit assigning a unique identification to each of the exterior lights;

a display being integrated into a dashboard of the vehicle at the manufacturing date of the vehicle wherein said display is configured to be visible to a driver, said display being in electrical communication with said monitoring circuit, said display displaying indicia comprising the names of each of the exterior lights on the vehicle, said display displaying the name of one of the exterior lights that corresponds a malfunction detected by said monitoring circuit wherein said display is configured to alert the driver exactly which exterior light on the vehicle has malfunctioned, each of the names of the exterior lights being associated with the unique identification of a respective one of the exterior lights, said display displaying the name of the exterior light associated with the unique identification received from said monitoring unit; and a communication unit being pluggable into a data port in the vehicle after the manufacturing date of the vehicle, said communication unit being in electrical communication with an electrical system of the vehicle when said communication unit is plugged into the data port such that said communication unit receives operational data pertaining to the exterior lights of the vehicle, said communication unit displaying a visual alert that corresponds to each of the exterior lights of the vehicle when said communication unit receives operational data indicating the malfunction in one or more of the exterior lights wherein said communication unit is configured to alert the driver exactly which exterior light on the vehicle has malfunctioned, said communication unit being wireless communication with a personal electronic device for communicating the operational data to the personal electronic device, said communication unit comprising:

a housing having a data plug being integrated, said data plug being pluggable into the data port in the vehicle;

a control circuit being positioned in said housing, said control circuit being electrically coupled to said data plug such that said control circuit receives the operational data from the electrical system of the vehicle, said control circuit receiving an alert input when any of the exterior lights on the vehicle malfunctions;

a plurality of light emitters, each of said light emitters being coupled to said housing wherein each of said light emitters is configured to be visible to the driver, each of said light emitters being electrically coupled to said control circuit, each of said light emitters being assigned to a respective one of the exterior lights of the vehicle, each of said light emitters being turned on when said control circuit receives said alert input which corresponds to the exterior light to which said light emitter is assigned wherein said plurality of light emitters is configured to communicate to the user exactly which of the exterior lights has malfunctioned; and a transceiver being positioned in said housing, said transceiver being electrically coupled to said control circuit, said transceiver being in wireless electrical communication with the personal electronic device for communicating the alert input to the personal electronic device wherein said transceiver is configured to notify the driver exactly which of the exterior lights has malfunctioned.

\* \* \* \* \*